Figure 1:
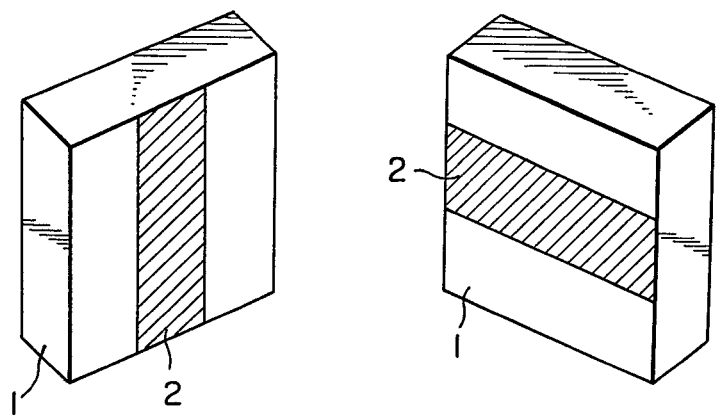

United States Patent [19]

Moriyama et al.

[11] 3,981,816

[45] Sept. 21, 1976

[54] LIQUID CRYSTAL DISPLAY DEVICE

[75] Inventors: Akio Moriyama, Katano; Masakazu Fukai, Nishinomiya; Komei Asai, Hirakata; Koshiro Mori, Nara, all of Japan

[73] Assignee: Matsushita Electric IndustrialCo., Ltd., Osaka, Japan

[22] Filed: Sept. 15, 1975

[21] Appl. No.: 613,425

Related U.S. Application Data

[63] Continuation-in-part of Ser. No. 415,361, Nov. 13, 1973, abandoned.

[30] Foreign Application Priority Data

| Nov. 15, 1972 | Japan | 47-114965 |
|---|---|---|
| Nov. 16, 1972 | Japan | 47-115374 |
| Nov. 17, 1972 | Japan | 47-115793 |
| Nov. 17, 1972 | Japan | 47-115794 |
| Nov. 17, 1972 | Japan | 47-115795 |
| Nov. 17, 1972 | Japan | 47-115829 |
| Nov. 20, 1972 | Japan | 47-116919 |
| Nov. 20, 1972 | Japan | 47-116981 |
| Nov. 20, 1972 | Japan | 47-116982 |
| Nov. 20, 1972 | Japan | 47-116983 |
| Nov. 20, 1972 | Japan | 47-116984 |
| Nov. 20, 1972 | Japan | 47-116986 |
| Nov. 20, 1972 | Japan | 47-116987 |
| Nov. 20, 1972 | Japan | 47-116992 |
| Nov. 20, 1972 | Japan | 47-116993 |
| Nov. 20, 1972 | Japan | 47-116994 |
| Nov. 20, 1972 | Japan | 47-116995 |
| Nov. 20, 1972 | Japan | 47-116996 |

[52] U.S. Cl. ............................ 252/299; 252/408; 350/160 LC
[51] Int. Cl.$^2$ .................... G02F 1/13; C09K 3/34
[58] Field of Search .............. 252/299, 408 LC; 350/160 L

[56] References Cited

UNITED STATES PATENTS

| 3,803,050 | 4/1974 | Haas et al. | 252/299 |
|---|---|---|---|
| 3,809,456 | 5/1974 | Goldmacher et al. | 350/160 LC |
| 3,848,966 | 11/1974 | Smith et al. | 252/299 |
| 3,853,391 | 12/1974 | Sorkin | 350/160 LC |
| 3,864,022 | 2/1975 | Moriyama et al. | 350/160 LC |
| 3,919,106 | 11/1975 | Asai et al. | 252/299 |

OTHER PUBLICATIONS

Moilliet, J. L.; Collie, B; & Black, W.; Surface Activity, 2nd Ed., E. & F. N. Spon Ltd., London, p. 473 (1961).

Creagh; J. Electron. Lett., vol. 1, pp. 350-354 (1972).

Haller, I.; et al. IBM Tech Discl. Bull., vol. 16, No. 1, pp. 119-120 (6/73).

*Primary Examiner*—Benjamin R. Padgett
*Assistant Examiner*—T. S. Gron
*Attorney, Agent, or Firm*—Stevens, Davis, Miller & Mosher

[57] ABSTRACT

In a liquid crystal display device comprising two glass substrate plates positioned in parallel with each other at a nearly constant interval and a liquid crystal interposed between said glass substrate plates, an electrode being provided on each of the opposite surfaces of said glass substrate plates and a voltage being applied between said electrodes, "haze" which appears at the display surface can be removed by using a liquid crystal composition containing one or more additives capable of controlling the orientation of the liquid crystal molecules (namely, capable of forming a perpendicular orientation phase).

4 Claims, 6 Drawing Figures

FIG. 2-A 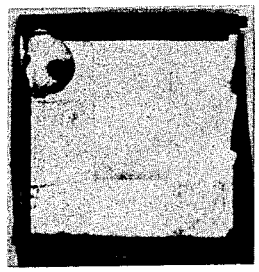  FIG. 2-B 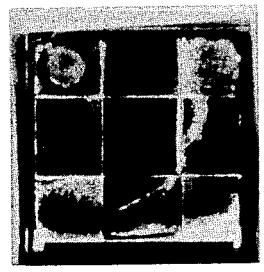  FIG. 2-C 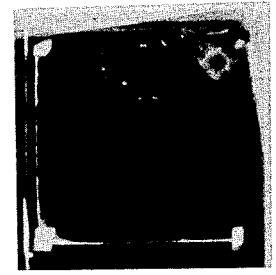

LIQUID CRYSTAL DISPLAY DEVICE

CROSS REFERENCE TO RELATED APPLICATION

This is a continuation-in-part of co-pending application Ser. No. 415,361 filed on Nov. 13, 1973, now abandoned.

The present invention relates to a liquid crystal display plate which shows no "haze".

More particularly, the present invention relates to a liquid crystal display device in which the liquid crystal exhibits a stable homeotropic structure.

In the liquid crystal display devices which use the conventional nematic liquid crystal, slight scattering of light occurs when no voltage is applied, namely, under the so-called zero voltage, and this phenomenon causes "haze" in a liquid crystal panel.

This "haze" results from light scattering at the interfaces of the panel by nematic liquid crystal molecules oriented at random.

The state where no "haze" is present can be formed by orienting the molecular axis of the liquid crystal perpendicular to the surface which encloses the liquid crystal or parallel with said surface. In the former, the liquid crystal structure is called homeotropic structure and in the latter, the structure is called homogeneous structure. The present invention provides a liquid crystal display plate having the stable homeotropic structure.

The development of the homeotropic structure of the liquid crystal is influenced by the surface condition of the substrate plates enclosing the liquid crystal, the properties of the plate and the tendency for the rod-like molecules of the nematic liquid crystal to orient parallel with each other with reference to their longer molecular axes.

The rod-like molecules of known nematic liquid crystals do not have molecular orientation strong enough to bring about orientation perpendicular to the surface of all substrate plates.

This is one cause for the "haze" which usually occurs in the liquid crystal display plate.

For forming homeotropic structure, there have been two kinds of methods, namely, treatment of the surface of the substrate plate and addition of compounds capable of controlling molecular orientation. Examples of these methods are as follows:

1. A method which comprises adding additives capable of controlling the molecular orientation of a nematic liquid crystal. (For example, dodecyltrimethyl ammonium bromides, cetyl esters of gallic acid, etc. are added.)
2. A method which comprises coating lecithin and the like on a glass substrate plate.
3. A method which comprises treating the surface of glass substrate plate with a dichromic acid and sulfuric acid mixed solution, hydrofluoric acid, etc.
4. A method which comprises providing a vacuum evaporated film of a metal oxide, a metal fluoride, etc. on a glass substrate plate.

In the surface treatments such as the chemical treatment of the method (3) and the formation of the vacuum evaporated film of the method (4), it is difficult to strongly orientate the liquid crystal molecules to form homeotropic structure and even if the homeotropic structure is formed, it has low stability for a long period of time. On the other hand, when additives capable of controlling the molecular orientation are added as in the methods (1) and (2), homeotropic structure of high stability can be obtained.

As additives capable of controlling the molecular orientation, substances having a specific molecular type are chosen.

Using these additives differing results are obtained depending upon the surface of the substrate plate. A homeotropic structure may be formed using untreated surfaces or a homeotropic structure having a high stability may be formed by contact with a treated polar surface.

These additives have the characteristics of a long alkyl chain and a polar group having adsorption activity at a terminal of the molecule.

The polar molecule of these additives is preferentially adsorbed onto the surface which encloses the liquid crystal to form an adsorbed mono-layer having molecular orientation. This mono-layer conveys direction of the perpendicular orientation to the adjacent layer of liquid crystal molecules. The liquid crystal molecules are kept parallel with each other by the inter-molecular force of the long alkyl chain of the adsorbed layer and as a result the liquid crystal molecules are made stably perpendicular to the interface. As terminal functional groups having adsorption activity, hydroxyl groups, carboxyl groups, carbonyl groups, quaternarized nitrogen atoms, sulfonic acid groups, phosphoric acid groups and the like are chosen. At least one of these groups should be present. When at least one of the active groups is connected to a cyclic hydrocarbon, the perpendicular orientation is easily brought about or becomes stable.

In general, a flat glass plate is used for the liquid crystal display plate and an electrode material such as a transparent electrode of a metal oxide or a metallic electrode of a reflective metal is placed on the surface of said glass plate.

These flat glass plates are usually kept parallel with each other with an extremely narrow interval of several $\mu$ to several ten $\mu$ and they are required to have high planeness. For this purpose, floating glasses having a high planeness are used or the surface of glass substrate is optically polished to increase the planeness. Some of the polishing procedures result in local scratches having a certain direction on the glass plate, due to which the orientation of the liquid crystal molecules is locally disturbed. The liquid crystal composition is in contact with the surfaces of the substrate plates which enclose said composition and the electrode material on the display plates. In general, the liquid crystal molecules placed on the polar surface of the electrode material cause perpendicular orientation, but conventionally it has been difficult to produce the perpendicular orientation phase on the surface of the glass substrate plate because of its properties and surface condition. Thus, even when compounds capable of controlling the orientation of molecules are added, the same results have been brought about.

Such being the case, it has been difficult to obtain a liquid crystal display plate having no "haze" in overall areas of the display plate.

The present invention provides a liquid crystal display device which uses a nematic liquid crystal composition containing at least one additive having the following general formula:

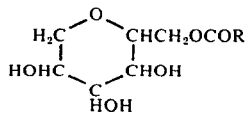

[wherein R is an alkyl group having 10 – 24 carbon atoms].

These compounds are capable of controlling the orientation of liquid crystal molecules.

That these additives affect the orientation is illustrated by the following one experimental Example.

FIG. 1 shows a construction of a cell used as one embodiment of the present invention.

FIG. 2-A is a photograph which shows orientation of molecules of the cell where a liquid crystal composition containing no additive was inserted.

FIG. 2-B is a photograph which shows orientation of molecules of the cell where a liquid crystal composition containing a known additive which controls orientation of the molecules was inserted.

FIG. 2-C is a photograph which shows orientation of molecules of the cell where a liquid crystal composition containing the additive of the present invention was inserted.

Figure 3:
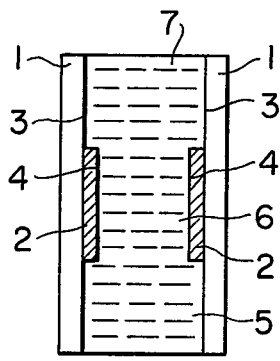
Figure 4:
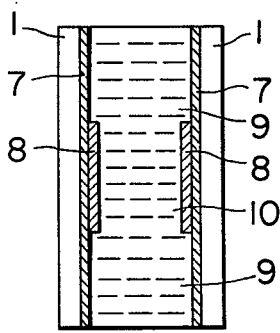

FIGS. 3 and 4 are rough sketches of the liquid crystal display plate used in the Examples of the present invention.

According to the present invention, a liquid crystal display plate having stable homeotropic structure which offers a uniform and good contrast of display can advantageously be applied to:

1. a liquid crystal display device using a dynamic scattering effect,
2. a liquid crystal display device using DAP (deformation of aligned phase) effect and
3. a liquid crystal display device using guest-host interaction applying a dichromatic dyestuff dissolved in a nematic liquid crystal, etc.

The present invention will be explained in detail in the following Examples.

EXAMPLE 1

The effects of the additives of the present invention are exhibited in a comparative test.

In the comparative test, there were employed a liquid crystal composition free from an additive, a liquid crystal composition containing a known molecular orientation-controlling additive (dodecyltrimethyl ammonium bromide) and a liquid crystal composition containing the present additive. As shown in FIG. 1, two surface-polished glass substrates (1) each provided with an indium oxide transparent electrode (2) of a determined width at the central portion on the internal surfaces thereof were disposed such that said transparent electrodes are rectangularly crossed with each other and the substrates (1) were maintained parallel with each other at an interval of about 10 microns. Each of the liquid crystal compositions to be tested was inserted between the two glass substrates to observe the state of molecular orientation.

The states of molecular orientations of the three compositions were compared by observing the state of each cell in which each liquid crystal composition was contained to determine whether "haze" appears or not and by observing the state of light transmitted by the cell by placing said cell between two crossed polarizers in parallel with the surface of said film and horizontally rotating it in various angles.

FIGS. 2-A, 2-B and 2-C show the state of light transmission of the cells placed between the two crossed polarizers, in which (A) a liquid crystal composition free from additive was inserted, (B) a liquid crystal composition to which 1.5 % by weight of dodecyltrimethyl ammonium bromide as a known additive for controlling molecular orientation was added was inserted; and (C) a liquid crystal composition to which 1.5 % by weight of sorbitan monolaurate as an additive of the present invention was added was inserted, respectively.

The liquid crystal composition referred to herein is a nematic mixture of p-methoxybenzylidene-p'-n-heptylaniline, p-ethoxybenzylidene-p'-n-butylaniline and p-n-propoxybenzylidene-p'-n-pentylaniline in equal ratio.

When the longitudinal axes of the liquid crystal molecules were oriented vertically to the surface of the substrate, haze did not appear in the cell and the cell placed between the two crossed polarizers became dark even if it was rotated horizontally at any angle.

In the cell containing the composition (A), haze was observed over the whole zone. In the cell containing the composition (B), no haze was observed at all in the zone where the liquid crystal composition was surrounded by one transparent electrode and another electrode, haze was sporadically observed in the zone where the composition was surrounded by the transparent electrode and the glass surface, and much haze was observed in the zone where the composition was surrounded by the two glass surfaces. Further, in the cell containing the composition (C), no haze was observed at all over the whole zone.

The photos show the results more clearly. In the composition (A), the orientation of liquid crystal molecules is almost random over the whole zone as is seen in FIG. 2-A. In the composition (C), transmitted light was dark over the whole zone as shown in FIG. 2-C and said state did not vary even when the cell containing the same was rotated horizontally at any angle. Said fact indicates that the longitudinal axes of the liquid crystal molecules were oriented vertically to the surfaces of the substrates surrounding said molecules. Further, in the composition (B), the molecules were vertically oriented in the zone surrounded by the facing transparent electrodes but the orientation in other zones was relatively random as shown in FIG. 2-B.

Similar results were obtained by use of sorbitan monopalmitate, sorbitan monostearate and sorbitan monooleate as additives in place of sorbitan monolaurate.

Sorbitan monofatty acid esters used as additives are shown in the following formulas.

1. Sorbitan monolaurate

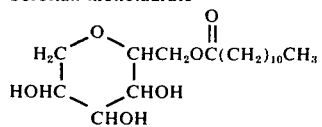

2. Sorbitan monopalmitate

-continued

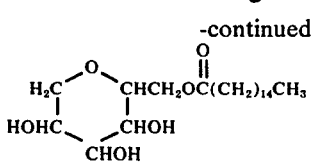

3. Sorbitan monostearate

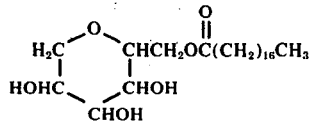

4. Sorbitan monooleate

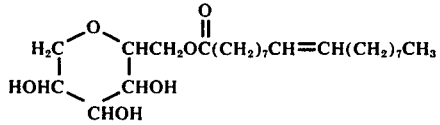

EXAMPLE 2

A liquid crystal composition containing an additive of the present invention was sufficiently applicable not only to glass surfaces but also to untreated surfaces of other materials.

The liquid crystal composition (C) disclosed in Example 1 was interposed between two polymethyl methacrylate plates. The observation of the state of its molecular orientation gave no haze.

When the surface of the substrate was subjected to a surface-active treatment such as chemical treatment and metal oxide-evaporating treatment, a similar effect was attained by the present additive even in a small amount thereof.

EXAMPLE 3

A similar test by use of liquid crystal materials other than those used in Example 1 was carried out to obtain a similar result.

Typical examples of the liquid crystal materials include p-anisylidene-p'-aminophenylacetate, p-anisylidene-p'-aminobenzonitrile, p-azoxyanisole, p-ethoxy-p'-n-hexanoyloxy azobenzene, p-n-hexylbenzoic acid-p'-n-hexyloxyphenyl esters, etc.

The liquid crystal composition containing the present additive can maintain the stable state at which no haze appears for a long period of time.

In general, a liquid crystal composition containing an additive for controlling the orientation of molecules has a relatively low electric resistance value. However, the liquid crystal composition containing the present additive has a relatively high electric resistance value (e.g. the liquid crystal composition containing 1.5 % by weight of sorbitan monolaurate which was used in Example 1 has an electric resistance value of $3 \times 10^9 \Omega$-cm) and thus, an apparatus having a long operation life can be produced.

The liquid crystal compositions which result in no haze are electro-optically important to a liquid crystal display device and largely contribute to the industry.

EXAMPLE 4

Glass substrate plate 1 which was optically polished and provided with a tin oxide electroconductive thin film 2 on the surface as shown in FIG. 3 was dipped in a mixed solution of dichromic anhydride and sulfuric acid for one minute.

A nematic liquid crystal containing the additive enumerated above was interposed in a container composed of said two enclosing glass plates the surfaces of which were subjected to chemical treatment as mentioned above and which were positioned at an interval of 10 microns. The nematic liquid crystal used was the same as in said experimental Example.

In FIG. 3, liquid crystal layer 5 was interposed by glass substrate plate surfaces 3 which were corroded and liquid crystal layer 6 was interposed between electrode material surfaces 4.

Regardless of the kind of additives used, the portions of liquid crystal layer 5 and liquid crystal layer 6 had no "haze" and were homogeneously transparent.

When this liquid crystal panel was placed between crossed linear polarizers and said panel was rotated, the transmitted light appeared homogeneously dark. This is due to the formation of homeotropic structure caused by the additives used in the present invention.

EXAMPLE 5

The same liquid crystal composition as used in Example 4 was interposed between two glass plates the surfaces of which were covered with an electrically insulating vacuum evaporated film 7 of magnesium fluoride, on which indium oxide vacuum evaporated film 8 was further provided as shown in FIG. 4.

In this case, liquid crystal layer 9 was interposed between the surfaces of the magnesium fluoride vacuum evaporated film and liquid crystal layer 10 was interposed between the surfaces of indium oxide electrode material.

As in Example 4, the whole layer in this liquid crystal panel also had no "haze" and was transparent regardless of the compositions (kind of the additives) of the liquid crystal interposed. Application of polarizers brought about the same results as those of Example 4 and the whole of the liquid crystal layer had the homeotropic structure.

Other effective examples of said electrically insulating thin films are those of silicon oxide, aluminum oxide, barium oxide, berylium oxide, bismuth oxide, magnesium oxide, nickel oxide, antimony oxide, tellurium oxide, thorium oxide, zinc oxide, indium oxide, tin oxide, etc.

As can be seen from Examples 4 and 5, when the surface of the glass substrate plate is subjected to chemical treatment, a liquid crystal composition containing the additives of the present invention is strongly adsorbed on the surfaces of the substrate plates, the higher fatty acid ester groups of the additives being stably vertically disposed to the surfaces of the substrates and the longitudinal axes of liquid crystal molecules adjacent thereto being oriented in parallel. As a result, the cell does not bring about haze.

What is claimed is:

1. A liquid crystal display device employing a nematic liquid crystal composition containing at least one homeotropic aligning additive having the following general formula:

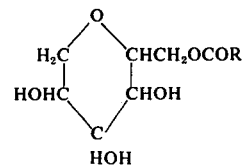

wherein R is an alkyl group having 10 – 24 carbon atoms.

2. The liquid crystal display device of claim 1, wherein the nematic liquid crystal composition containing at least one of said additives is interposed between two glass substrate plates, the inner opposite surfaces of said plates being at least partially provided with transparent thin film metal or metal oxide electrodes with the remaining portions of said opposite surfaces not so provided with said electrodes being subjected to chemical treatment or being provided with electrically insulating vacuum evaporated film.

3. A liquid crystal display device according to claim 1, wherein as the nematic liquid crystal, an equal weight mixture of p-anisylidene-p-n-heptylaniline, p-ethoxybenzylidene-p-n-butylaniline and p-n-propoxybenzylidene-p-n-pentylaniline is used.

4. A liquid crystal display device according to claim 2, wherein the electrically insulating vacuum evaporated film is selected from magnesium fluoride, silicon oxide, aluminum oxide, barium oxide, berylium oxide, bismuth oxide, magnesium oxide, nickel oxide, antimony oxide, tellurium oxide, thorium oxide, zinc oxide, indium oxide and tin oxide.

* * * * *